US005096602A

United States Patent [19]

Yamauchi et al.

[11] Patent Number: 5,096,602

[45] Date of Patent: Mar. 17, 1992

[54] METHOD OF REMOVING AIR BUBBLES IN A COATING PATH BEFORE FEEDING A COATING LIQUID

[75] Inventors: Shingo Yamauchi; Yoshikatsu Takagi, both of Kanagawa, Japan

[73] Assignee: Fuji Photo Film Co., Ltd., Kanagawa, Japan

[21] Appl. No.: 636,460

[22] Filed: Dec. 31, 1990

[30] Foreign Application Priority Data

Jan. 8, 1990 [JP] Japan .......................................... 2-602

[51] Int. Cl.$^5$ .............................................. B01D 37/00

[52] U.S. Cl. ........................................ 210/767; 55/36; 55/37; 134/26; 210/258; 210/416.1; 427/307

[58] Field of Search ........................ 55/36, 37, 56, 185, 55/54, 55; 134/22.11, 22.14, 22.19, 22.15, 12, 26; 430/523; 427/307; 210/767, 258, 416.1

[56] References Cited

U.S. PATENT DOCUMENTS

| | | | |
|---|---|---|---|
| 3,926,664 | 12/1975 | Verreydt | 55/55 |
| 4,050,940 | 9/1977 | Habu et al. | 430/523 |
| 4,935,151 | 6/1990 | Do | 55/55 |

*Primary Examiner*—Robert A. Dawson
*Assistant Examiner*—Sun Uk Kim
*Attorney, Agent, or Firm*—Sughrue, Mion, Zinn, Macpeak & Seas

[57] ABSTRACT

A method of feeding a coating liquid into a path from a tank to a coating apparatus through a filter and a degassing apparatus by a pump, comprising the steps of preparing a cleaning liquid containing degassed warm water in advance and aqueous solution of low surface tension; pouring the cleaning liquid into the path through the filter by the pump to dissolve bubbles contained in the filter into the cleaning liquid; exhausting the cleaning liquid from the path; filling the path as far as the coating apparatus with the new cleaning liquid anew; and substituting a coating liquid for the cleaning liquid sequentially.

7 Claims, 1 Drawing Sheet

METHOD OF REMOVING AIR BUBBLES IN A COATING PATH BEFORE FEEDING A COATING LIQUID

BACKGROUND OF THE INVENTION

The present invention relates to a method of feeding a coating liquid from a coating liquid tank to a coating apparatus through a filter and a degassing apparatus by a feeding pump.

In the prior art, as described in Japanese Patent Examined Publication No. 43722/1987, gas in a path of a coating liquid is driven away by using water degassed in advance as a cleaning liquid and by supplying the cleaning liquid in the path successively for a considerable time to prevent from bubble trouble happening after pouring a coating liquid in the path.

However, in the case of pouring the degassed water as cleaning liquid in the path including a filter of removing foreign substances in a coating liquid, bubbles attached to the filter made of organic macromolecule fiber such as polypropylene and cellulose etc., are eluted in the cleaning liquid, are scattered in the path after the filter and are caught easily by a non-hydrophilic material such as packing members provided at joints of pipes, by cracks in the inside of the pipes and the like. Further, the degassed water does not have so high wettability to the filter as the coating liquid, so that it is difficult to remove the bubbles sufficiently. Therefore, if the coating liquid is poured in the path after the degassed water is poured in the path as described above, the remaining bubbles in the filter or the bubbles trapped in the pipes mix into the coating liquid again, and cause the bubble trouble on the substrates coated with the coating liquid.

Therefore, according to the prior art, a considerably long time is required to clean the inside of the pipes.

SUMMARY OF THE INVENTION

An object of the present invention is to solve the above-described problems and is to provide a method of driving all bubbles out of the coating liquid feeding system in a short time.

The above object of the present invention is achieved with the following method.

The method of feeding a coating liquid from a coating liquid tank to a coating apparatus through a filter and a degassing apparatus by a pump, comprising the steps of:

- preparing warm water degassed in advance and an aqueous solution of low surface tension as a cleaning liquid;
- pouring the cleaning liquid through the filter by the pump to make bubbles which are contained in the filter dissolve into the cleaning liquid;
- exhausting the cleaning liquid together bubbles out of the path;
- filling the path with a new cleaning liquid; and
- substituting a coating liquid for the cleaning liquid sequentially.

The coating liquid is, for example, for a photo sensitive material.

In the present invention, the water degassed in advance is obtained by degassing water through methods described, for example, in Japanese Patent Examined Publication No. 43722/1987 or Japanese Patent Unexamined Publication No. 120668/1986, and by adjusting the temperature of the water to a value comparable to that of the coating liquid before the degassed water is poured in the pipes.

In the present invention, the same kind of surface active agent as that contained in the coating liquid is preferably used as the solution of low surface tension. For example, an anionic sulfonic acid type surface active agent which effects little to the photo-character of a photo sensitive material is used, and the concentration thereof it is preferably 0.01–0.5%.

The features of the present invention are as follows.

(1) Degassed warm water and an aqueous solution of low surface tension are used as a degassing cleaning liquid.

The degassed warm water drives away bubbles. The aqueous solution of low surface tension makes wettability of the cleaning liquid to a filter increased to be equal to that of a coating liquid, so that the remaining bubbles are absorbed in the cleaning liquid. Consequently, the inside of the filter and the following path can be sufficiently degassed. The degassed warm water and the aqueous solution of low surface tension may be poured separately in the path. Further, the mixed liquid of them may be poured in the system.

(2) Bubbles contained in the filter are dissolved in the cleaning liquid and exhausted out of the path.

Thus bubbles are not caught by a non-hydrophilic material such as packing members of the path or by the cracks of the inside of the pipes following the filter unlike the prior art. In order to practice this feature, a path-changing valve at a position following the filter is provided to take the cleaning liquid out of the system after cleaning the filter.

(3) Then, the cleaning liquid fills the pipe system and finally the aqueous solution of low surface tension is poured.

Thus, bubbles still adhering the inside of the pipe are dissolved into the cleaning liquid so that bubbles are completely driven out. Then, the coating liquid is poured in the pipes.

The present invention is especially effective for feeding the coating liquid for a photo sensitive material which is susceptible to bubble trouble.

DESCRIPTION OF THE PREFERRED EMBODIMENTS

Figure 1:
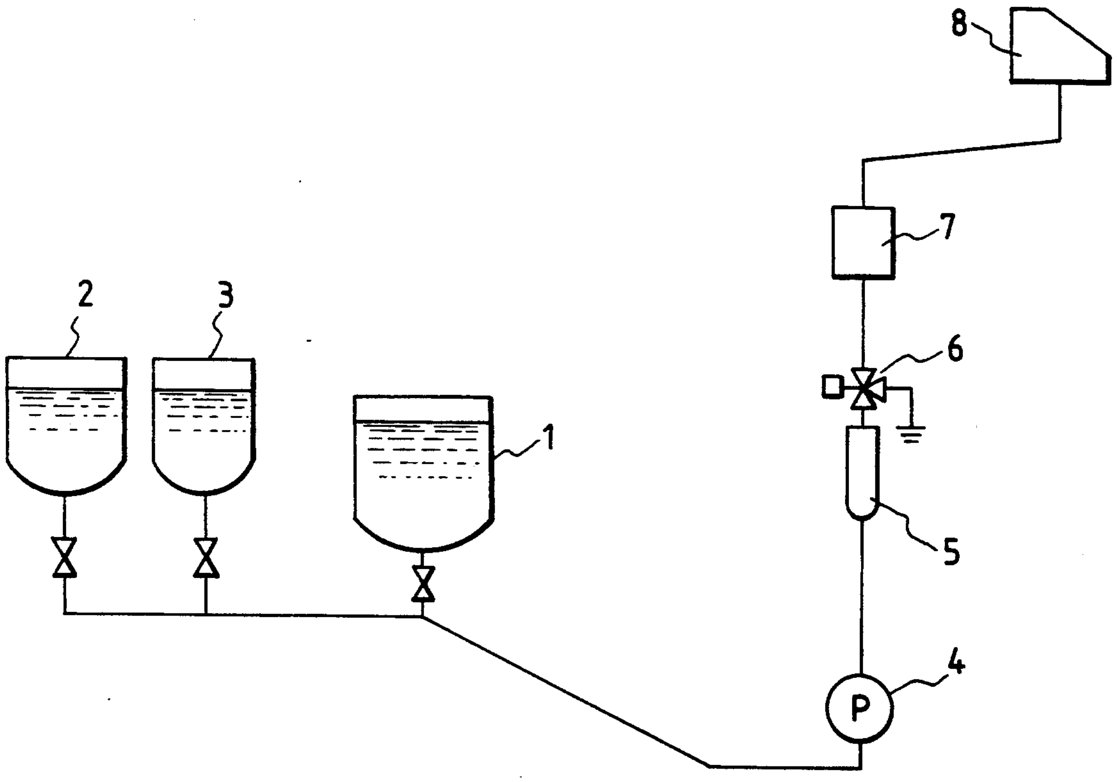
FIG. 1 is a flow sheet showing an embodiment of the present invention.

An embodiment of the present invention will now be described with reference to FIG. 1.

Before the coating liquid for a photo sensitive material having components shown in Table 1 is fed from a coating liquid tank 1,

TABLE 1

| | |
|---|---|
| gelatine aqueous solution | 1000 parts |
| polystyrene sulfonic acid type viscosity increasing agent which increases viscosity | 15 parts |
| anionic sulfonic acid type surface active agent | 5 parts |
| viscosity of a liquid | 60 cps(40° C.) |
| surface tension | 35 dyne/cm |

a bottom valve of a degassed water tank 2 filled with the warm water of 40° C. degassed in advance is opened, and next a bottom valve of a tank 3 filled with 0.1% aqueous solution of anionic sulfonic type surface active agent, which is the same as a surface active agent included in the photo sensitive material, as an aqueous solution of low surface tension is opened to feed the cleaning liquid to a filter 5 by a feeding pump 4 so as to dissolve bubbles contained in the filter into the cleaning liquid, and the cleaning liquid is exhausted out of the path by a path-changing valve 6 which is provided before a degassing apparatus. Then, the path-changing valve 6 is changed to pour the aqueous solution of low surface tension into a degassing apparatus 7 and to fill the cleaning liquid in the path as far as a coating apparatus 8. After the cleaning liquid absorbs the bubbles in the path, the coating liquid in the coating liquid tank 1 is substituted for the cleaning liquid by opening a bottom valve of the tank 1.

In substituting the coating liquid for the cleaning liquid, it is possible to begin the coating without bubble trouble as soon as the coating liquid is substituted to be filled in the path, as the bubbles contained in the filter and the path are dissolved into the cleaning liquid in advance so that the bubbles do not exist in the path.

The number of the bubbles was calculated by arranging bubble detectors at the exhausting exit of the path-changing valve 6 and at the position directly before the coating apparatus 8. The result is as shown in Table 2.

TABLE 2

| | Present Invention | Prior Art |
|---|---|---|
| The number of the exhausted bubble from the filter (the degassed water) piece/min. | 25 | 25 |
| The number of the exhausted bubble from the filter (the aqueous solution of low surface tension) piece/min. | 70 | — |
| The number of the bubble in the coating liquid directly after substituting piece/min. | 0 | 80 |
| The time of cleaning min. | 40 | 60 |
| The amount of a cleaning liquid l. | 240 | 600 |

The degassing effect is improved to degas completely in the path according to the method of the present invention. Therefore, the time to clean the inside of the path is shorter, the amount of the cleaning liquid is smaller, and the quality of the coated products is higher. Further, coating can be started as soon as the coating liquid is substituted in the path, so the costly coating liquid is not used wastefully until the bubbles in the coating liquid is exhausted from the path. Besides, as the bubbles from the filter are not accidentally issued, even the degassing apparatus having small capacity, which is disposed before the coating apparatus, can degas sufficiently. Therefore, the present invention contributes much to the quality of products and the cost thereof.

What is claimed is:

1. A method of feeding a coating liquid into a path from a coating liquid tank to a coating apparatus through a filter and a degassing apparatus by a pump, comprising the steps of:

preparing warm water degassed in advance and aqueous solution of low surface tension as a cleaning liquid;

pouring said cleaning liquid into said path through said filter by said pump to dissolve bubbles contained in said filter into said cleaning liquid;

exhausting said cleaning liquid out of said path;

filling said path as far as said coating apparatus with said cleaning liquid anew; and substituting a coating liquid for said cleaning liquid sequentially.

2. A method as claimed in claim 1, wherein said coating liquid is for a photo sensitive material.

3. A method as claimed in claim 1, wherein said cleaning liquid is exhausted out of said path by a path-changing valve provided before said degassing apparatus.

4. A method as claimed in claim 1, wherein said warm water and said aqueous solution are separately poured.

5. A method as claimed in claim 1, wherein said warm water and said aqueous solution are mixed and poured.

6. A method as claimed in claim 1, wherein said aqueous solution has a surface tension of about 35 dyne/cm.

7. A method as claimed in claim 1, wherein said aqueous solution includes 0.01–0.5% of anionic sulfonic type surface active agent.

* * * * *